Patented Nov. 27, 1951

2,576,094

UNITED STATES PATENT OFFICE 2,576,094

NONCRYSTALLIZING ROSIN AND PROCESS OF PREPARING THE SAME

Justus C. Barthel, Stamford, Conn., assignor to American Cyanamid Company, New York, N. Y., a corporation of Maine No Drawing. Application September 15, 1949, Serial No. 115,945

3 Claims. (Cl. 260—105)

The present invention relates to the manufacture of rosin compositions and more particularly to rosin compositions of improved and enhanced properties.

Rosin sizes are usually produced by saponifying rosin with alkalies. In preparing liquid rosin sizes the rosin is usually heated with an aqueous solution of sodium carbonate, employing about 9–16% of the carbonate, based on the weight of the rosin, at about 190–212° F. for about 6 hours. In the preparation of dry rosin size the rosin is frequently reacted with about 9–12% of sodium or potassium hydroxide in the form of a relatively concentrated aqueous solution which produces the dry size directly. Dry rosin size is also produced by subjecting the liquid size, prepared as described above, to evaporation on a drum drier or by spray drying. Rosin sizes are prepared by the above procedures from either gum rosin or wood rosin.

The dry rosin sizes possess several advantages over liquid size solutions, particularly in shipment and storage, but are subject to oxidation with time. In some cases, especially with the spray dried or other finely divided forms of saponified rosin, the rate of oxidation on storage may be so rapid that the considerable heat developed constitutes a serious fire hazard. The dry rosin sizes also tend to darken in color during storage and show increased foaming tendencies when added to paper stock suspensions because of oxidation.

In order to overcome these difficulties it has been proposed to add antioxidants to dry rosin size in order to retard or present oxidation upon storage. A wide variety of chemical compounds including phenothiazine have been found to be effective for this purpose.

Phenothiazine has advantages over other materials used as stabilizers and antioxidants for dry rosin sizes in that it is relatively cheap, is available commercially in large quantities, it causes no discoloration of paper sizes with rosin sizes containing it and is sufficiently stable of itself to permit incorporation into the rosin size composition during the manufacture of the latter. It also reduces the tendency of size containing it to foam in use which is highly desirable.

However, laboratory physiological tests indicated an idiosyncrasy in some warm blooded animals toward phenothiazine which was manifested by dermatitis.

The primary object of the present invention is to include phenothiazine in a rosin composition in such a way that the tendency toward dermatitis will be eliminated without detracting from the efficiency of its use as a stabilizer, antioxidant or antifoamer.

It has been found that if from 0.1% to 1.0% of phenothiazine, based on the weight of the rosin used, is incorporated into the rosin during the heat treatment of the latter and prior to saponification, these desirable objects are attained.

The surprising discovery was made that if phenothiazine is present during the heat treatment of the rosin, the added but important effects of increased optical rotation for the same time or the same optical rotation for a shortened treatment time were obtained over incorporation at any subsequent point in the process.

The invention, therefore, comprises a method of making a rosin composition by heating rosin with phenothiazine, and the resultant composition.

The invention further contemplates the use of such a composition in the manufacture of liquid or dry rosin sizes by the usual methods. The treated rosin has other uses as well.

The usual rosin heat treatment before saponification is ordinarily practiced in order to make the rosin, particularly wood rosin, non-crystallizing when used in rosin size compositions. The effectiveness of the heat treatment in the production of a non-crystallizing rosin may be measured by the increase in optical rotation of the treated rosin. In commercial practice this heat treatment is usually carried out at temperatures within the range of 265° C. to 300° C., and with wood rosin and some gum rosins, several hours of heating are required to obtain the desired effect. Where necessary, the heat treatment takes place under an inert atmosphere.

The following table shows laboratory runs where phenothiazine was present during the heat treatment of the rosin and the resultant product incorporated into rosin sizes.

Table 1

| Run No. | Heat Treatment at 300° C. Min. | Phenothiazine Added, Per Cent | Specific Rotation of Rosin, Degrees | Acid No. of Rosin | Crystallization Observations [2] | |
|---|---|---|---|---|---|---|
| | | | | | 50% Crystallized in-days | At the end of 40 days |
| OBSERVATIONS ON WOOD ROSINS AND WOOD ROSIN SIZES | | | | | | |
| 0 | 0 | None | +9.5 | 165.0 | 8 | Solid. |
|  | 0 | 0.25 | +7.4 | 161.4 | 5 | Do. |
| 1 | [1]0 | None | +4.3 | 160.2 | 22 | Do. |
| 2 | [1]0 | 0.25 | +13.5 | 156.0 | | No crystals. |
| 3 | 15 | None | +9.1 | 152.6 | 32 | Solid. |
| 4 | 15 | 0.25 | +19.8 | 157.0 | | No crystals. |
| 5 | 30 | None | +10.4 | 156.0 | | Do. |
| 6 | 30 | 0.25 | +28.5 | 148.0 | | Do. |
| 7 | 90 | None | +19.1 | 150.1 | | Do. |
| 8 | 90 | 0.25 | +44.4 | 138.5 | | Do. |
| 9 | 120 | None | +23.4 | 147.9 | | Do. |
| 10 | 120 | 0.25 | +48.2 | 136.7 | | Do. |
| OBSERVATION ON GUM ROSIN | | | | | | |
| 11 | 0 | None | +36.1 | 165.5 | | |
| 12 | 30 | None | +13.3 | 150.8 | | |
| 13 | 30 | 0.25 | +30.3 | 139.3 | | |

[1] Brought up to 300° C. and then allowed to cool.
[2] Crystallization tests made on liquid 70% rosin size.

These sizes were tested by measuring their foaming index since the tendency of a rosin size dispersion to foam is a measure of its degree of oxidation. The foaming index is determined by the following procedure:

To 20 cc. of a 5% aqueous solution of the size there is added 5 cc. of a 10% solution of $$Al_2(SO_4)_3 \cdot 14H_2O$$

and the mixture is poured into 180 cc. of water and agitated for one minute in a motor driven laboratory mixer. The dispersion is then poured into a 500 cc. graduate and the volume of foam is measured. The foaming index, expressed in per cent, is the ratio of the volume of the foam to the volume of liquid. It is found by the formula:

$$\frac{\text{Total volume (liquid + foam)} - 205}{205 \text{ (volume of liquid)}} \times 100 = \text{foaming index}$$

This procedure was used to determine the foaming index of the sizes described above, both initially and after aging at 65° C. for 16 hours in a bomb in an atmosphere of pure oxygen under 50 lbs. gage pressure. It has been found that this procedure provides a good accelerated test for indicating the relative stability of the size to oxidation under normal aging conditions. The results are given in the following table:

Foaming index

| Phenothiazine | Before Aging | After Aging |
|---|---|---|
| 0.25 before heat treatment | 2.4 | 2.4 |
| 0.25 after heat treatment | 9.8 | 12.2 |
| 0.50 before heat treatment | 0 | 0 |
| 0.50 after heat treatment | 7.3 | 7.3 |

Based upon the above successful runs, commercial sized batches were run as follows:

In each case the molten rosin was brought up to 150° C. in the heat treating tank and the phenothiazine as a dry powder introduced through a small hole in the top of the tank while the mass was circulated. Then the circulation pump was stopped and the heat treatment begun. During this period the temperature reached 285° C. Samples were taken from time to time and optical rotation determined. Surprisingly enough it has been found that heat treatment with and without phenothiazine for the same period of time produces greater optical rotation when phenothiazine is present. Heat treatment was stopped when the optical rotation figure indicated below was obtained. This figure is approximately twice that usually occurring after heating the rosin for the same period of time without phenothiazine.

Circulation by pump was carried out again while the rosin cooled to 200° C.

Table 2

| Batch | Lbs. of M Wood Rosin | Lbs. Phenothiazine | Per Cent Phenothiazine | Optical Rotation |
|---|---|---|---|---|
| 1 | 17,600 | 44.0 | 0.25 | +25.2 |
| 2 | 17,600 | 61.5 | 0.35 | +24.6 |
| 3 | 17,600 | 88.0 | 0.50 | +25.0 |

The heat treated rosin was pumped at 200° C. to the size cooker where it was converted to liquid size by the usual methods.

Part of the liquid size prepared as above was dried in drum driers and converted to dry size.

Foaming tests were made with the above commercial batch sizes before and after aging in the oxygen bomb for 16 hours. All three sizes produced zero foam both before and after aging. This indicated that the phenothiazine was more effective as an antioxidant when added during the rosin heat treatment than at a subsequent time.

Physiological tests indicated a lack of dermatitis on laboratory animals showing that this problem had been successfully solved.

Tests of the liquid and dry size for brightness and sizing efficiency gave entirely satisfactory results which were substantially no different from tests made on comparable sizes made with phenothiazine added after the heat treatment.

Inasmuch as different grades of rosin, both of the wood and gum variety, normally require different temperatures and times of heat treatment for the normal purpose of rendering them non-crystalline, it is to be understood that the invention contemplates the addition of phenothiazine during the heat treatment regardless of the temperature and time obtaining. The invention is, therefore not to be limited to the conditions expressed in the above tables.

Liquid and dry rosin sizes made from saponified rosin which had been heat treated with phenothiazine was found to be as effective as that made where the phenothiazine was added subsequent to the rosin heat treatment both as to sizing properties, antioxidant and antifoaming qualities and such material had the added advantage that it did not produce dermatitis.

It is also to be observed that in Table 1, the temperature employed was 300° C. This was well above the melting point of any rosin treated. Inasmuch as this temperature is in excess of those usually encountered in the commercial heat treatment of rosin, it was interesting to discover that the effectiveness of the phenothiazine as an antioxidant was not destroyed thereby. Generally speaking, however, the heat treatment temperature may be materially less than the maximum of 300° C. and may even be as low as 250° C., although at lesser temperatures a longer heat treatment time may be required.

From Table 1 above it will be noted that by the treatment of this invention, a greater optical rotation is obtained than otherwise. It is believed that this increased optical rotation is evidence that the phenothiazine has catalyzed the conversion of the rosin acids to a more stable form. The resultant product, therefore, by reason of its decreased tendency to crystallize and better stability to oxidation makes it admirably suited to uses other than for the manufacture of rosin size. Examples of such uses are manufacture of synthetic resins, ester gums, varnishes, core oils, gloss oils and the like.

While the invention has been described with particular reference to specific embodiments, it is to be understood that it is not to be limited thereto but is to be construed broadly and restricted solely by the scope of the appended claims.

I claim:

1. The method which comprises heating rosin at from 250 to 300° C. with from 0.1% to 1.0% of phenothiazine for not less than 15 minutes.

2. In a method of making rosin size by heat treating the rosin, and saponifying the same with an alkali, the improvement which comprises carrying out the heat treatment step in the presence of from 0.1% to 1.0% of phenothiazine.

3. A rosin composition prepared by the method of claim 1.

JUSTUS C. BARTHEL.

REFERENCES CITED

The following references are of record in the file of this patent:

UNITED STATES PATENTS

| Number | Name | Date |
|---|---|---|
| 2,294,723 | Dreshfield | Sept. 1, 1942 |
| 2,471,714 | Barthel | May 31, 1949 |